| (12) United States Patent | (10) Patent No.: US 9,228,606 B2 |
|---|---|
| Dufresne | (45) Date of Patent: Jan. 5, 2016 |

(54) HOOK WITH HOLDING MEANS AND METHOD FOR HOLDING DOWN UNDERGROUND TANK WITH A STRAP

(71) Applicant: PULTRUSION TECHNIQUE INC., Saint-Bruno (CA)

(72) Inventor: Robert P. Dufresne, Saint-Bruno (CA)

(73) Assignee: PULTRUSION TECHNIQUE INC., Saint-Bruno, Quebec (CA)

( * ) Notice: Subject to any disclaimer, the term of this patent is extended or adjusted under 35 U.S.C. 154(b) by 0 days.

(21) Appl. No.: 14/356,947

(22) PCT Filed: Nov. 7, 2012

(86) PCT No.: PCT/CA2012/050791
§ 371 (c)(1),
(2) Date: May 8, 2014

(87) PCT Pub. No.: WO2013/067641
PCT Pub. Date: May 16, 2013

(65) Prior Publication Data
US 2014/0291471 A1    Oct. 2, 2014

Related U.S. Application Data

(60) Provisional application No. 61/556,966, filed on Nov. 8, 2011.

(51) Int. Cl.
*A47B 97/00* (2006.01)
*F16B 45/02* (2006.01)
*B65D 90/12* (2006.01)

(52) U.S. Cl.
CPC .............. *F16B 45/02* (2013.01); *B65D 90/12* (2013.01); *Y10T 24/4523* (2013.01); *Y10T 24/4755* (2013.01)

(58) Field of Classification Search
CPC ..... F16B 45/02; B65B 90/12; Y10T 24/4523; Y10T 24/4755
See application file for complete search history.

(56) References Cited

U.S. PATENT DOCUMENTS

| 5,728,787 A * | 3/1998 | Cantor ..................... 526/216 |
| 6,059,252 A | 5/2000 | Emmann et al. |
| 7,946,005 B2 * | 5/2011 | Lee ........................ 24/582.11 |
| 2014/0102259 A1 * | 4/2014 | Albrecht et al. ............ 81/3.09 |

FOREIGN PATENT DOCUMENTS

| CA | 2257307 A1 | 12/1997 |
| CA | 2457914 A1 | 8/2005 |

* cited by examiner

*Primary Examiner* — Amy Sterling
(74) *Attorney, Agent, or Firm* — Baker & Hostetler LLP

(57) ABSTRACT

A hook, a hold down strap and a method for holding down an underground tank. The hook includes a base portion connectable to the hold down strap; a curved portion extending from the base portion and defining a concave receiving area having an entrance sized and configured for receiving an anchor element. The hook includes at least one hooking aid member being a flexible member or an extension member. The flexible member extends across the entrance of the concave receiving area and is sized and configured to bend from a closed position to an open position such that, when the anchor element traverses the entrance, the flexible member bends from the closed position toward the concave receiving area to the open position, thus allowing the anchor element to enter the concave receiving area. The extension member extends from the curved portion beyond the entrance of the concave receiving area.

26 Claims, 14 Drawing Sheets

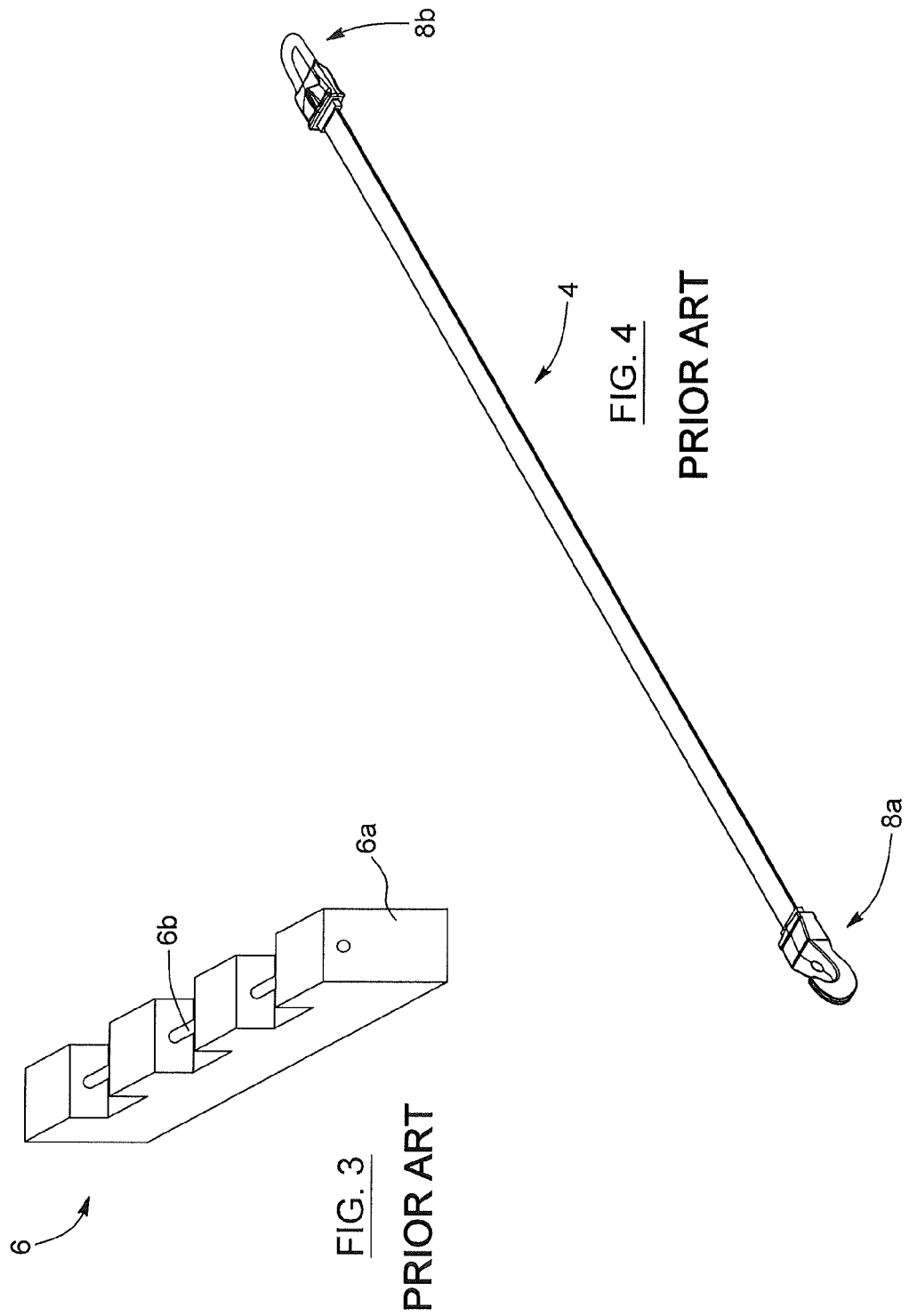

HOOK WITH HOLDING MEANS AND METHOD FOR HOLDING DOWN UNDERGROUND TANK WITH A STRAP

REFERENCE TO RELATED APPLICATIONS

This application is a National Stage of International Application No. PCT/CA2012/050791, filed on Nov. 7, 2012, which claims priority to U.S. Provisional Application No. 61/556,966, Nov. 8, 2011, the disclosures of which are incorporated by reference in their entirety.

FIELD OF THE INVENTION

The present invention generally relates to the anchoring of underground tanks and, more particularly, to a hook comprising holding means and/or guiding means facilitating an efficient holding down of an underground tank with a strap. The present invention also relates to a method for holding down an underground tank.

BACKGROUND OF THE INVENTION

Underground tanks are used to store large amounts of fluids such as water, gas, oil or solvents. These tanks must be anchored underground to prevent them from possibly floating upward or displacing due to ground water or moving. Conventional anchor blocks, also referred as deadman anchors, are made of concrete and underground tanks may be composed of steel, stainless steel, single, double, triple-wall fiberglass or a combination thereof.

Regulations in underground tank storing are rigorous because a failure in the installation or operation of the tank can lead to contamination of soil and groundwater or increased safety risks for workers during installation. For instance, workers may not be allowed to go inside the hole to the level of the anchor blocks beneath the tank and must stay at the top of the tank to perform installation or maintenance operations.

Generally, underground tanks are attached to concrete anchor blocks located on both sides of the tank, using anchor straps provided with hooks at either end. Known hooks may be classified under various categories such as C-shaped hooks, D-shaped hooks and T-shaped hooks. A hook is connected to each of the two ends of the strap and is configured to engage an anchor block provided below or at the bottom of the tank (as seen in FIGS. 1A and 1B). Straps may include fiberglass, nylon, polyester, steel or other adequate metallic materials.

To install underground tanks, several workers often throw an end of a strap from the top of the tank toward one of the anchor blocks so as to hook onto an anchor element of the anchor block. Workers have to repeat the throwing until they succeed in grabbing the concrete anchor with the hook. This operation is difficult because one end of the strap may be unhooked due to slack on the strap while workers are hooking or installing the other end of the strap. This operation is also difficult because the top of the tank is narrow and may be slippery for the workers. When workers are allowed to anchor the underground tank from the ground, one hooked end of the strap is generally maintained with difficulty on one anchor while workers hook the other end of the strap to the opposed anchor.

Furthermore, fluctuations of the water level or earth movements may lead to an undesirable unhooking from the anchor element.

As underground ambient conditions are favorable to rust and corrosion, materials and construction have to be chosen carefully. Stainless steel, fiberglass and hot dip galvanized cast iron are better suited for these rigorous conditions.

Known springhooks or hooks provided with a retaining mechanism, i.e. which opens and closes the hook opening under the action of a spring, have the challenge that moving mechanical components such as springs, often made of steel, may have a propensity to rust or corrode in certain environments. Additionally, the retention mechanism of the springhook is fragile.

There is indeed a need in the industry for a hook that would overcome at least some of the aforementioned disadvantages and challenges.

SUMMARY OF THE INVENTION

According to one aspect of the present invention, there is provided a hook for attaching a hold down strap to an anchor element for holding down an underground tank. The hook includes a main component and a flexible member. The main component includes a base portion connectable to the hold down strap; a curved portion extending from the base portion and defining a concave receiving area having an entrance sized and configured for receiving the anchor element. The flexible member extends across the entrance of the concave receiving area and is chemically fixed to the main component, the flexible member being sized and configured to bend from a closed position to an open position such that, when the anchor element traverses the entrance, the flexible member bends from the closed position toward the concave receiving area to the open position, thus allowing the anchor element to enter the concave receiving area. The flexible member then returns to the closed position thus retaining the anchor element within the receiving area.

In an optional aspect of the hook, the flexible member may be provided with a degree of flexibility enabling sufficient bending in response to casting the hook from an upper part of the underground tank to allow entry of the anchor element into the concave receiving area, while preventing sufficient bending to allow releasing the anchor element from the concave receiving area in response to slack on the hold down strap.

In an optional aspect of the hook, the flexible member may be chemically fixed to the main component using a non-corroding adhesive. The non-corroding adhesive may include epoxy, thermoset resin, polyester, vinyl ester, acrylic, silicone, or thermal glue. The thermal glue may include polypropylene and/or polyethylene.

In an optional aspect of the hook, the flexible member may be fixed to the base portion.

In an optional aspect of the hook, the base portion may have a longitudinal axis generally aligned with the hold down strap and the flexible member may extend in parallel relation to the longitudinal axis.

In an optional aspect of the hook, the base portion may include a slot and the flexible member may have a mounting segment that is mounted within the slot and chemically fixed therein. The slot may be provided within a protrusion that extends from the base portion away from the concave receiving area. The slot may further have a dove-tail shape.

In an optional aspect of the hook, the curved portion has an end tip and the flexible member may be arranged in opposed and aligned relation with the end tip. The flexible member may further be spaced away from the end tip.

In an optional aspect of the hook, the flexible member may be composed of pultruded material. The flexible member may be composed of thermoplastic or elastomeric thermoset material.

In an optional aspect of the hook, the flexible member may have a rod shape. The flexible member may also have an elongated tab shape.

In an optional aspect of the hook, the main component may be a one-piece structure. The main component may further be composed of galvanized metal.

In an optional aspect of the hook, the flexible member may be a first flexible member and the hook further may further include a second flexible member extending in opposed parallel relation to the first flexible member.

In an optional aspect of the hook, the base portion may include a first slot and a second slot provided on either side thereof, the first and second flexible members each having a mounting segment that are respectively mounted within the first and second slots and chemically fixed therein.

In an optional aspect of the hook, the hook may include an extension member extending from the curved portion beyond the entrance of the concave receiving area. The extension member may be configured in oblique relation to the flexible member.

In an optional aspect of the hook, the curved portion may include a slot and the extension member may have a mounting segment that is mounted within the slot and chemically fixed therein.

In an optional aspect of the hook, the extension member may be a first extension member and the hook further may further include a second extension member extending in opposed parallel relation to the first extension member.

In an optional aspect of the hook, the extension member may be molded onto the main component as a one-piece structure.

In an optional aspect of the hook, the extension member may have a guiding surface sized and configured to be aligned with an inner surface of the curved portion so as to define a substantially continuous or co-planar surface along which the anchor element slides, thereby facilitating the entrance of the anchor element into the concave receiving area.

In an optional aspect of the hook, the extension member may include an elongated upper component and a lower component, the lower component being connected to the elongated upper component and provided with the guiding surface.

In an optional aspect of the hook, the lower component may be chemically fixed to the elongated upper component.

In an optional aspect of the hook, the lower component may be of rectangular shape. The lower component has a distal end which may be tapered.

In an optional aspect of the hook, the extension member may further include an intermediate component, the intermediate component being located between the elongated upper component and the lower component.

In an optional aspect of the hook, the lower component may extend along the elongated upper component unto an end tip of the curved portion. The lower component may also extend along the elongated upper component and farther along the curved portion.

In an optional aspect of the hook, there is provided a hook for attaching a hold down strap to an anchor element for holding down an underground tank, the hook including a main component and an extension member. The main component includes a base portion connectable to the hold down strap; and a curved portion extending from the base portion and defining a concave receiving area having an entrance sized and configured for receiving the anchor element. The extension member extends from the curved portion beyond the entrance of the concave receiving area and is fixed to the main component, the extension member having a guiding surface sized, configured and aligned to facilitate guidance and entrance of the anchor element into the concave receiving area.

In an optional aspect of the hook, the guiding surface may be sized, configured and aligned with an inner surface of the curved portion of the hook so as to define a substantially continuous or co-planar surface for enhancing the sliding of the anchor element into the concave receiving area.

In an optional aspect of the hook, the extension member may include an elongated upper component and a lower component, the lower component being connected to the elongated upper component and provided with the guiding surface.

In an optional aspect of the hook, the lower component may be chemically fixed to the elongated upper component.

In an optional aspect of the hook, the lower component may be of rectangular shape. The lower component has a distal end which may be tapered.

In an optional aspect of the hook, the extension member may further include an intermediate component, the intermediate component being located between the elongated upper component and the lower component.

In an optional aspect of the hook, the lower component may extend along the elongated upper component unto an end tip of the curved portion. The lower component may also extend along the elongated upper component and farther along the curved portion.

According to another aspect of the present invention, there is provided a hook for attaching a hold down strap to an anchor element for holding down an underground tank. The hook includes a main component and at least one hooking-aid member. The main component includes a base portion connectable to the hold down strap; and a curved portion extending from the base portion and defining a concave receiving area having an entrance sized and configured for receiving the anchor element. The at least one hooking-aid member extends from the main component and is configured to facilitate cooperation of the anchor element into the concave receiving area.

In an optional aspect of the hook, the hooking-aid member may be the flexible member or the extension member as defined above.

According to another aspect of the present invention, there is provided a hold down strap for holding down an underground tank. The hold down strap includes a strap having two opposed ends; and a hook as defined above attached to at least one of the two opposed ends.

According to still another aspect of the present invention, there is provided a method of holding down an underground tank which includes providing a hold down strap having a first end and a second end and including a hook attached to the first end. The hook includes a main component and a flexible member. The main component includes a base portion connectable to the hold down strap; and a curved portion extending from the base portion and defining a concave receiving area having an entrance for sized and configured for receiving the anchor element. The flexible member extends across the entrance of the concave receiving area, the flexible member being sized and configured to bend from a closed position to an open position. The method further includes providing an underground tank having an upper part; providing an anchor element proximate to the tank and below the upper part thereof; and casting the first end of the hold down strap from the upper part of the underground tank down toward the anchor element such that the anchor element traverses the entrance of the concave receiving area. The crossing of the entrance causes the flexible member to bend from the closed position toward the concave receiving area to the open position, thus allowing the anchor element to enter the concave receiving area. The flexible member then returns to the closed position thus retaining the anchor element within the receiving area.

In an optional aspect of the method, the method may include providing the flexible member chemically fixed to the main component.

In an optional aspect of the method, the method may include providing the hook with an extension member and the casting of the hook including guiding the anchor element toward the entrance of the concave receiving area along the extension member for guiding the anchor element.

In an optional aspect of the method, the method may include providing the flexible member with a degree of flexibility enabling sufficient bending in response to casting the hook to allow entry of the anchor element into the concave receiving area while preventing sufficient bending to allow releasing the anchor element from the concave receiving area in response to slack on the hold down strap.

BRIEF DESCRIPTION OF THE DRAWINGS

Embodiments of the hook, hold down strap and method according to the present invention are represented in and will be further understood in connection with the following figures.

FIG. 3 (Prior Art) is a perspective view of an anchor block.

FIG. 4 (Prior Art) is a perspective view of a conventional fiberglass strap with a C-shaped hook and a D-shaped hook for holding down underground tanks.

While the invention will be described in conjunction with example embodiments, it will be understood that it is not intended to limit the scope of the invention to these embodiments. On the contrary, it is intended to cover all alternatives, modifications and equivalents as may be included as defined by the present description and appended claims.

DETAILED DESCRIPTION OF THE INVENTION

The present invention relates to a hook including holding means which provide a solution for preventing the hook from unhooking from an underground tank anchor, and further include guiding means which facilitate the anchorage of the hook to the anchor.

Figure 1:
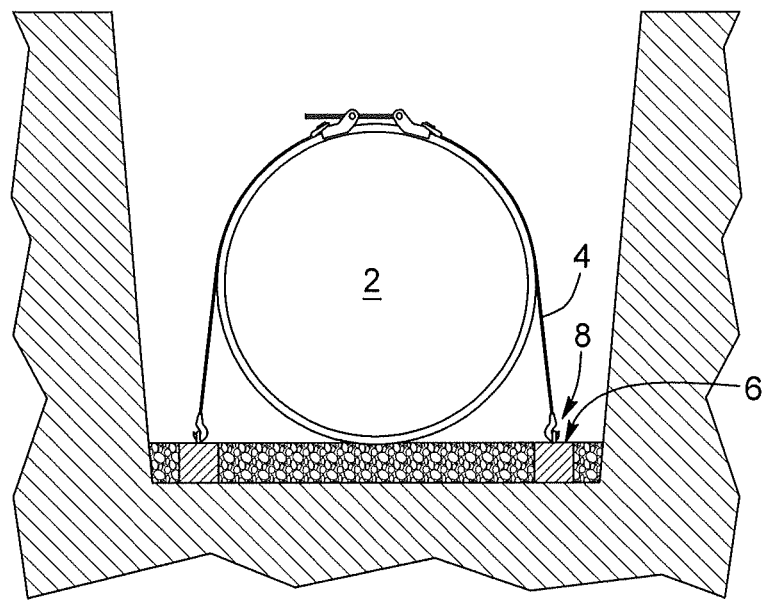
FIG. 1 (Prior Art) is a schematic front view of an anchored underground tank.
Figure 2:
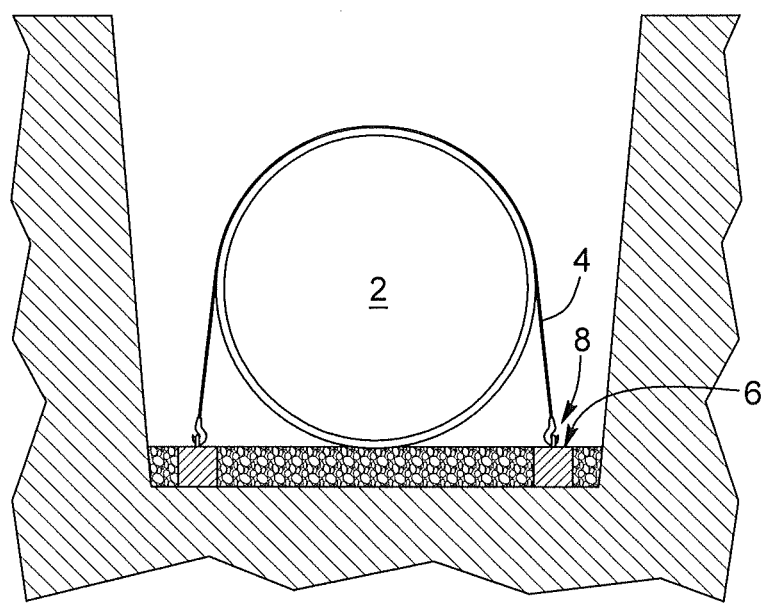
FIG. 2 (Prior Art) is a schematic front view of an anchored underground tank.

Underground tanks need to be held down underground for preventing them from moving or floating upward with underground water. As illustrated on FIGS. 1 and 2 (Prior Art), the anchorage of an underground tank (2) is performed with at least one strap (4) which must be fixed to anchor blocks (6) on each side of the tank (2) in order to secure it. FIG. 1 shows two straps (4) surrounding a tank (2) and tightened together at the top the tank (2) with a binding assembly. FIG. 2 shows a single strap contacting and holding down the underground tank (2). In both FIGS. 1 and 2, the straps (4) are provided with a hook (8) on either end. The anchorage of the hook (8) to the anchor block (6) is a difficult operation because the main challenge is to keep the connection between the strap (4) and the anchor block (6) on one side of the tank (2) while connecting the strap (4) to another anchor block (6) on the other side of the tank (2), or to the binding assembly as in FIG. 1. The operation is even more complex when the connection between the strap (4) and the anchor block (6) has to be performed from the top of the tank (2). As the tension of the strap (4) is established, the hooks (8) may escape the anchor (6). That is the reason why workers must maintain the hooks (8) in place while tightening the strap (4) with the binding assembly. Hooks (8) may also be released from the anchor (6) during flood, earthquake, drought or any situation inducing movement of the ground.

FIG. 3 (Prior Art) illustrates a conventional anchor block (6) including a concrete block base (6a) holding an embedded anchor element as a rod (6b). The hook catches onto the embedded rod (6b).

Figure 5:
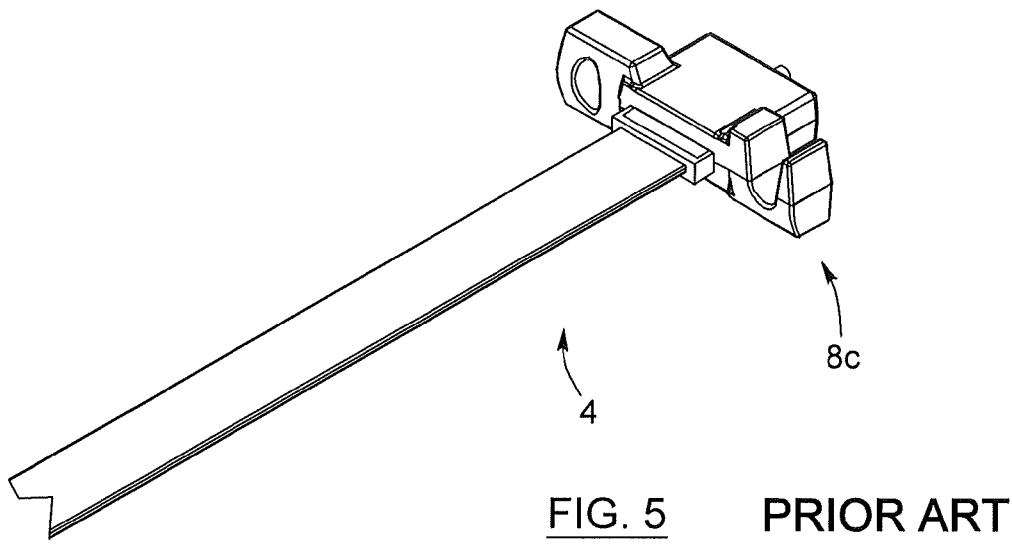
FIG. 5 (Prior Art) is a perspective view of a conventional T-shaped hook for anchoring underground tanks.
Figure 6:
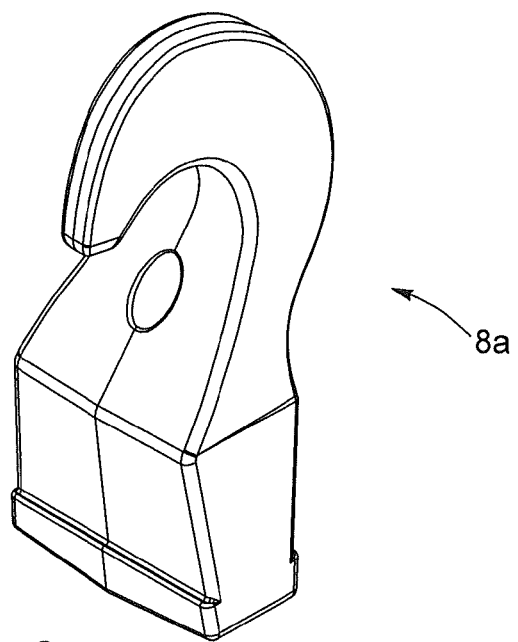
FIG. 6 (Prior Art) is a perspective view of a conventional C-shaped hook for anchoring underground tanks.

Referring to FIGS. 4, 5 and 6, conventional straps (4) are provided with hooks (8a, 8b, 8c) at either end. Generally, these hooks may be classified under three categories which are C-shaped hooks (8a), D-shaped hooks (8b) and T-shaped hooks (8c). Hooks may be connected to each end of the strap (4). C and D-shaped hooks (8a and 8b) are configured to engage anchor blocks (6) provided underground. D-shaped and T-shaped hooks (8c) may be provided to the end of the strap which is connected to the top of the tank as in the configuration illustrated in FIG. 1. FIG. 4 illustrates a DC strap where the strap (4) is provided with a C-shaped hook (8a) at one end and a D-shaped hook (8b) at the other end. A strap (4) may also have a TC configuration with a C-shaped hook (8a) at one end and T-shaped hook (8c) at the other end as represented on FIG. 5. The configurations of the straps are various and are not limited to the embodiments illustrated in the figures; for example, CC straps or DD straps are also possible configurations. A conventional C-shaped hook (8a) is represented in greater detail on FIG. 6. Workers encounter difficulties to secure these conventional C-shaped hooks (8a) to the anchor block (6) since these hooks may easily escape from the anchor block (6) if the strap (4) is not tightly held.

Figure 7:
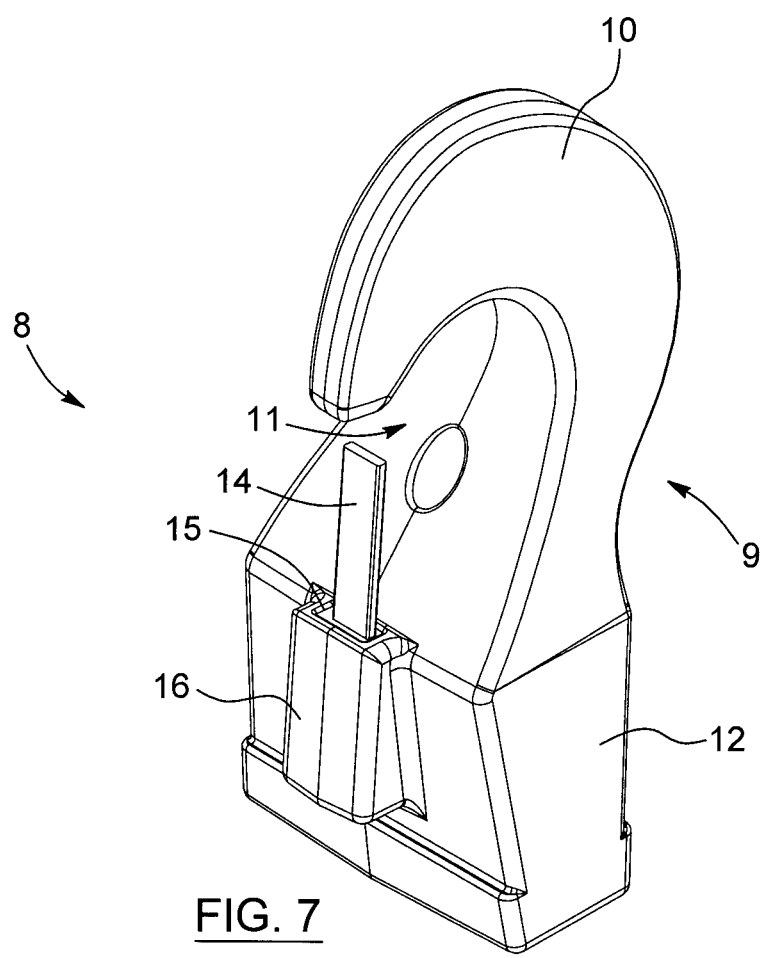
FIG. 7 is a perspective view of a C-shaped hook provided with a flexible member according to an optional aspect of the present invention.

Referring to FIG. 7, the present invention provides a hook (8) which differs from conventional hooks (8a, 8b, 8c) by including holding means for holding the anchor block (6) onto the hook (8). According to one aspect of the present invention, for attaching the hold down strap (4) to the anchor block (6), the hook (8) includes a main component (9) having a curved portion (10) defining a concave receiving area (11) for the anchor element (6b) of the anchor block (6), and a base portion (12) connectable to the hold down strap (4). The curved portion (10) extends from the base portion (12) and is optionally a generally C-shaped portion. The concave receiving area (11) includes an entrance which is sized and configured for receiving the anchor element (6b). The hook (8) also includes a flexible member (14) extending across the entrance of the concave receiving area (11) as holding means. The flexible member (14) is chemically fixed to the main component (9), optionally to the base portion (12) which defines a longitudinal axis generally aligned with the hold down strap (4). The flexible member (14) optionally extends from the base portion (12) in parallel relation to this longitudinal axis. Optionally, the base portion (12) may include a slot (15) from which the flexible member (14) extends across the entrance of the concave receiving area (11) of the hook (8). Optionally, the base portion (12) may include a protrusion (16) provided with the slot (15) and extending away from the base portion (12) with parallel relation to the longitudinal axis.

Figure 10:
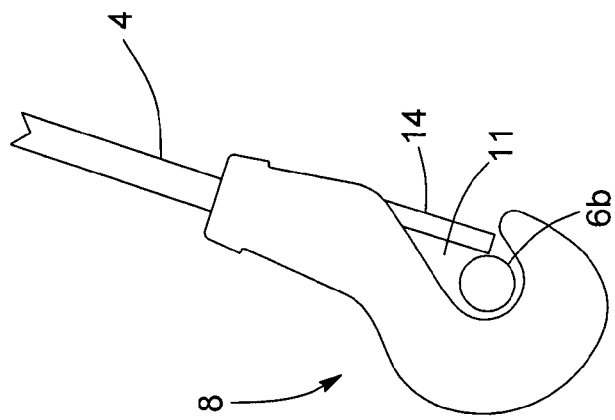
FIGS. 8 to 10 are side view schematics of hooking steps according to another optional aspect of the present invention.
Figure 9:
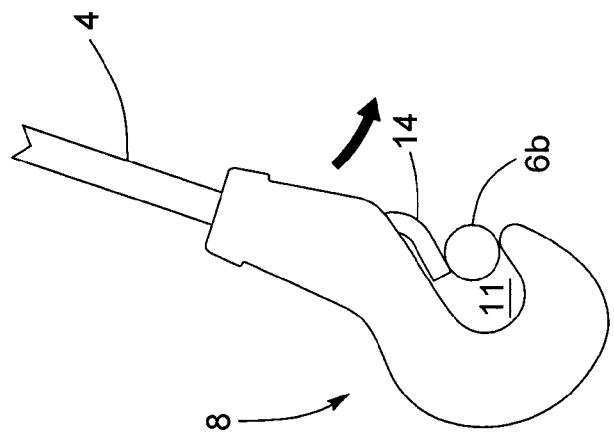
Figure 8:
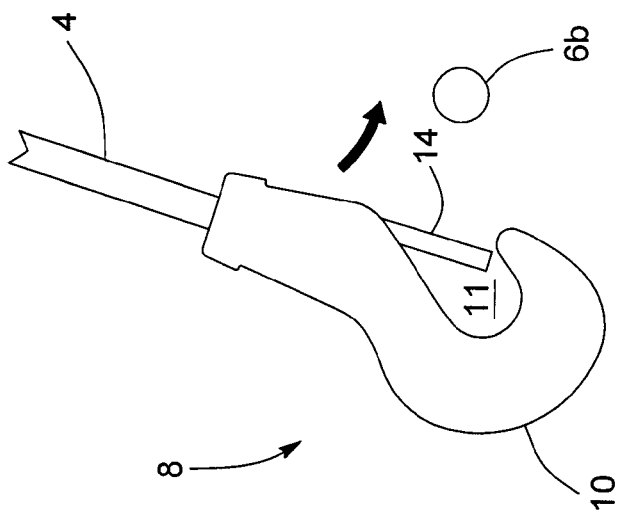

Referring to FIGS. 8 to 9, a casting of the above-described hook (8) for holding down of the underground tank may be described into three main stages according to the present invention. FIG. 8 illustrates the hook (8) provided at one end of the hold down strap (4) and cast from an upper part of the underground tank down toward the anchor element (6b) of the anchor block. The flexible member (14) is sized and configured to bend from a closed position (FIG. 8) to an open position (FIG. 9). FIG. 9 illustrates the bending of the flexible member (14) from its closed position to its open position while the anchor element (6b) traverses the entrance of the concave receiving area (11) thus allowing the anchor element (6b) to enter this area (11). Referring to FIG. 10, when the anchor element (6b) is completely engaged into the area (11), the flexible member (14) moves back to its closed position in order to retain the anchor element (6b) within the concave receiving area (11), thereby securing the hook (8) to the anchor block. Once one side of the hold down strap (4) is secured to an anchor block, thanks to the flexible member (14), the other side of the hold down strap (4) may be attached more easily to another anchor block or to the binding assembly at the top of the tank (FIG. 1).

Optionally, the flexible member (14) has a degree of flexibility enabling sufficient bending in response to casting of the hook (8) to allow the anchor element (6b) to enter into the concave receiving area (11). The degree of flexibility of the flexible member (14) also prevents sufficient bending allowing release of the anchor element (6b) from the concave receiving area (11) in response to slack on the hold down strap (4).

Figure 11:
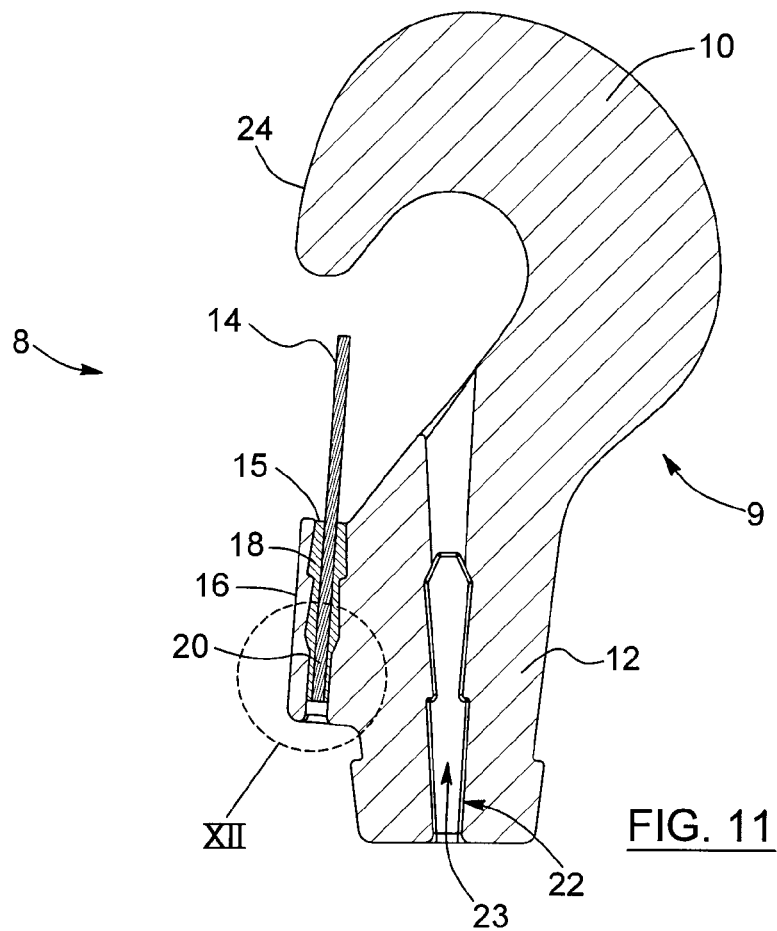
FIG. 11 is a side cross-sectional view of the C-shaped hook according to FIG. 7.
Figure 12:
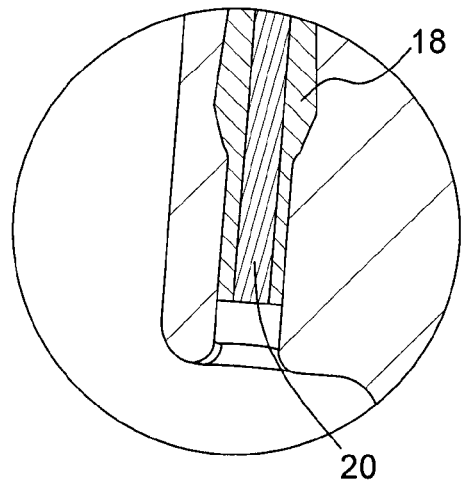
FIG. 12 is a zoom view of a mounting portion of the flexible member of area XII of FIG. 11.
Figure 13:
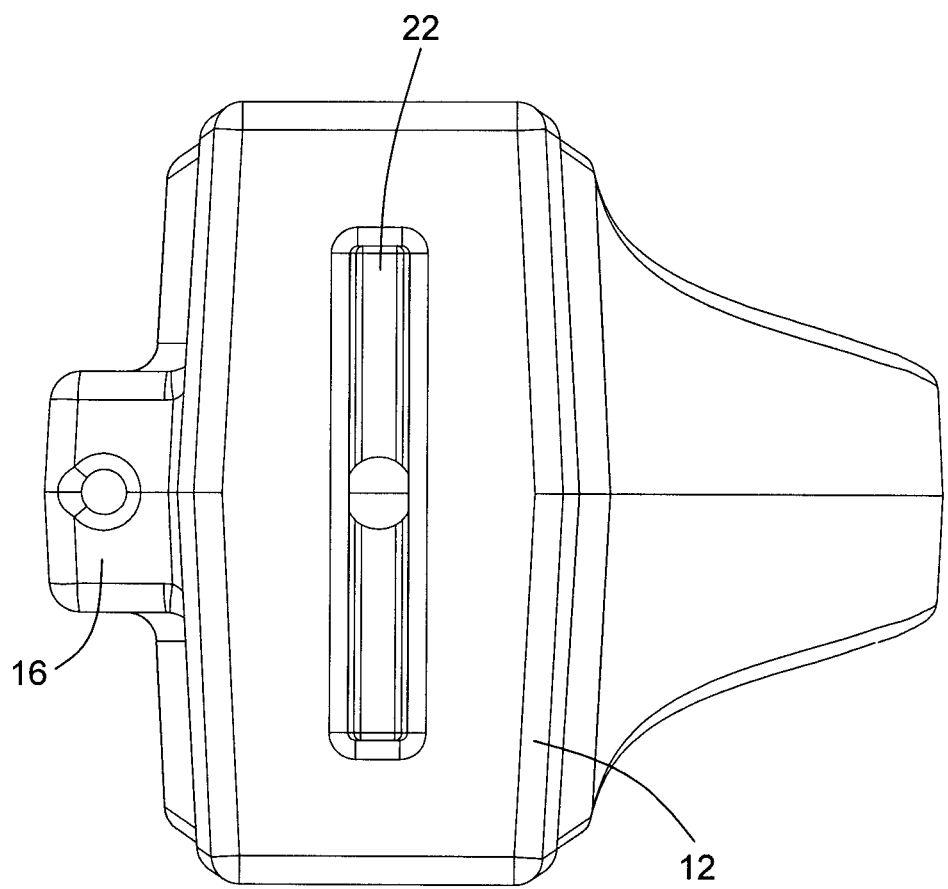
FIG. 13 is a bottom view of the C-shaped hook according to FIG. 7.

Referring to FIGS. 11, 12 and 13, the chemical fixing of the flexible member (14) to the main component (9) is obtained with a non-corroding adhesive (18) such as epoxy or similar strong adhesive. Thermoset resins, thermal glue, silicon oil-based or water-based glue are examples of suitable adhesives. Thermoset resins may be polyester, urethane, vinyl ester, acrylic, phenolic, or thermal glue. Thermal glue may be polypropylene or nylon. The flexible member (14) may include a mounting part (20) chemically fixed into the slot (15). The slot (15) optionally has a dove tail shape to enhance the strength of the connection with the mounting part (20). The mounting part (20) of the flexible member (14) may be chemically fixed with the above mentioned adhesive within the dove tail shaped slot (15) and may further include a surface with retention angles to enhance the connection.

Similarly, the hook (8) includes a strap slot (22) optionally having a dove tail shape for connecting the hold down strap (4) via a connecting insert (23) to the bottom of the base portion (12). Furthermore, as better seen on FIG. 11, the curved portion (10) has an end tip (24) from which the flexible member is optionally spaced away and arranged in opposed and aligned relation with it.

Figure 14:
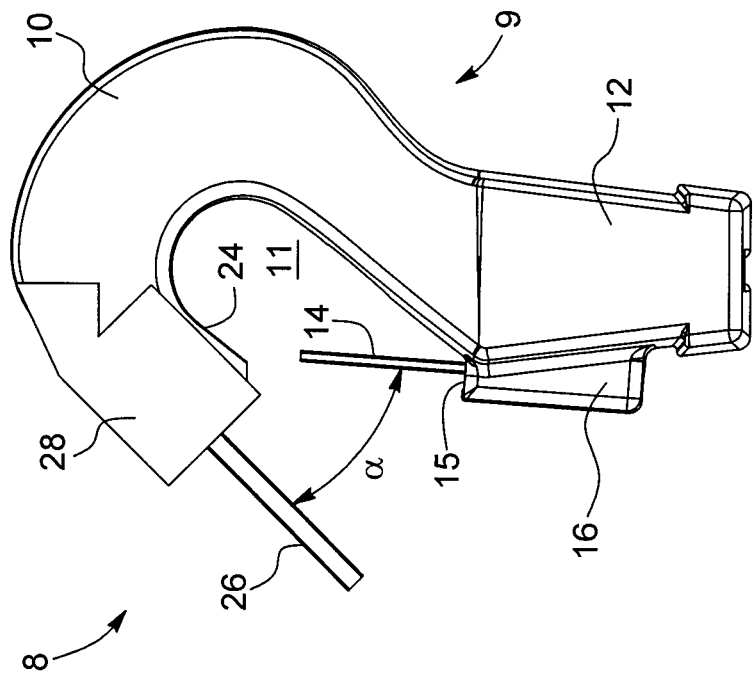
FIG. 14 is a perspective view of a C-shaped hook provided with an extension member according to another optional aspect of the present invention.
Figure 15:
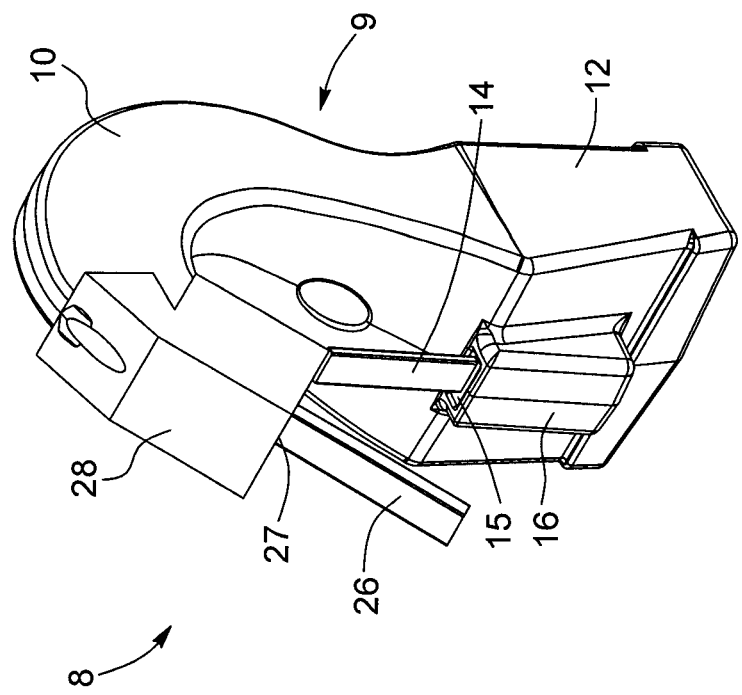
FIG. 15 is a side view of the C-shaped hook provided with an extension member according to FIG. 14.

Referring to FIGS. 14 and 15, according to an optional aspect of the present invention, the hook (8) may also include an extension member (26) extending from the curved portion (10) beyond the entrance of the concave receiving area (11). The extension member (26) is optionally configured in oblique relation to the flexible member (14). The extension member may be engaged into a slot (27) provided on a casing component (28) which is fitted to the end tip (24) of the curved portion (10) so as to hold the extension member (26) onto the hook (8). The extension member (26) may have a mounting portion chemically fixed into the slot (27), similar to the flexible member (14). While a worker casts the hook (8) down toward the anchor element (6b), the extension member (26) advantageously enables a guiding of the anchor element (6b) toward the entrance of the concave receiving area (11) as the hook (8) falls near the anchor element or when pulling the hook (8).

Figure 16:
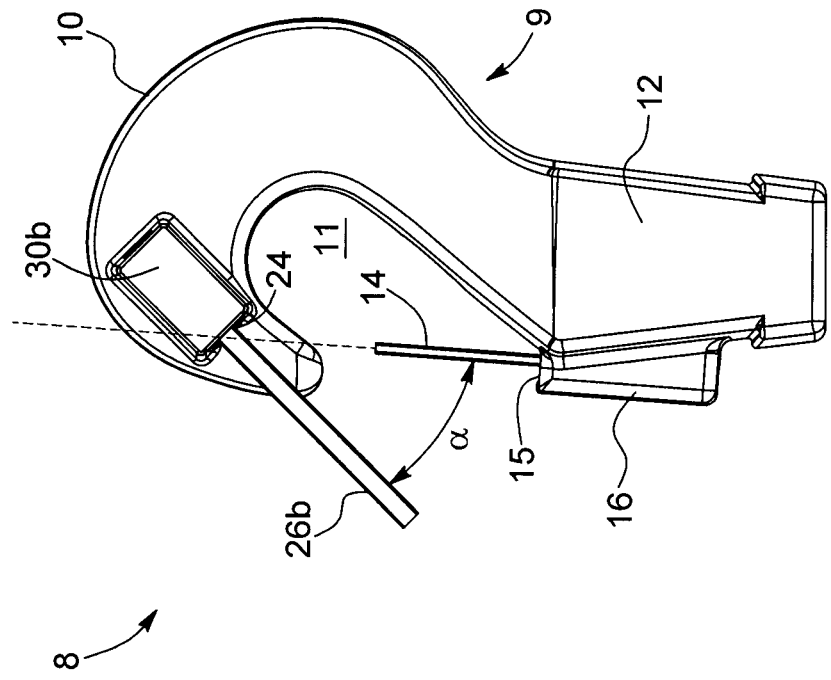
FIG. 16 is a perspective view of a C-shaped hook provided with a pair of extension members according to another optional aspect of the present invention.
Figure 17:
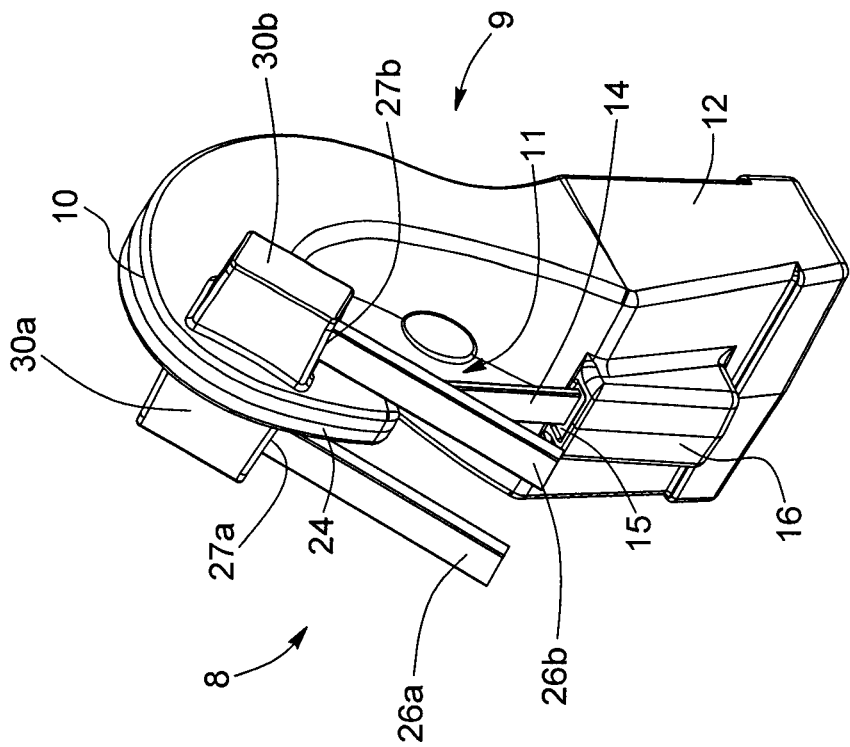
FIG. 17 is a side view of the C-shaped hook provided with a pair of extension members according FIG. 16.
Figure 19:
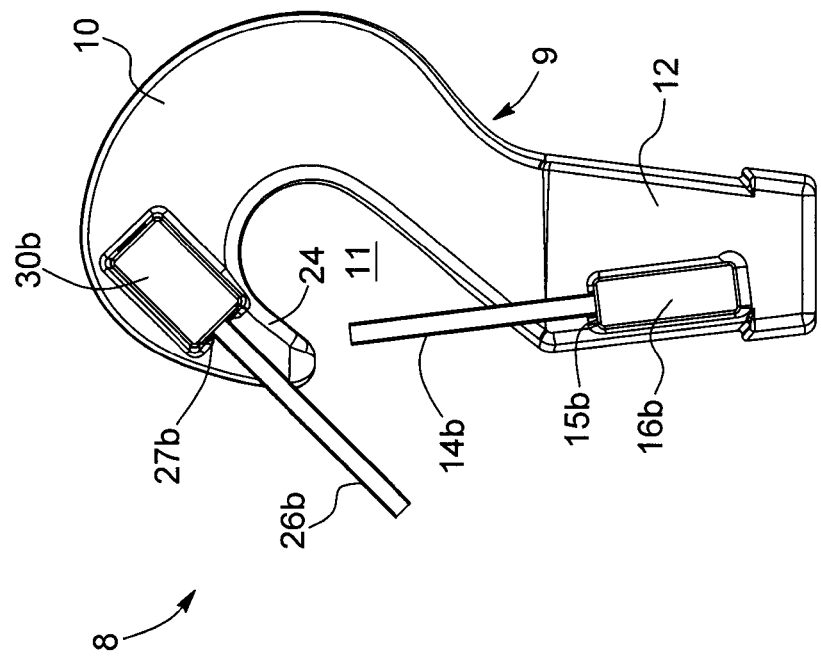
FIG. 19 is a side view of the C-shaped hook according to FIG. 18.
Figure 18:
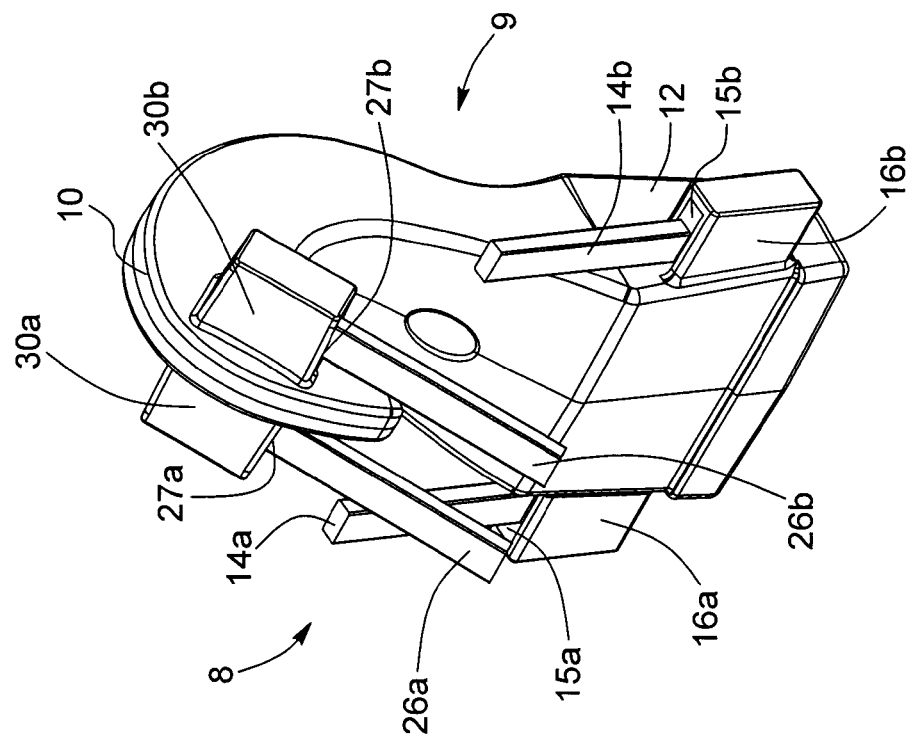
FIG. 18 is a perspective view of a C-shaped hook according to another optional aspect of the present invention.
Figure 22:
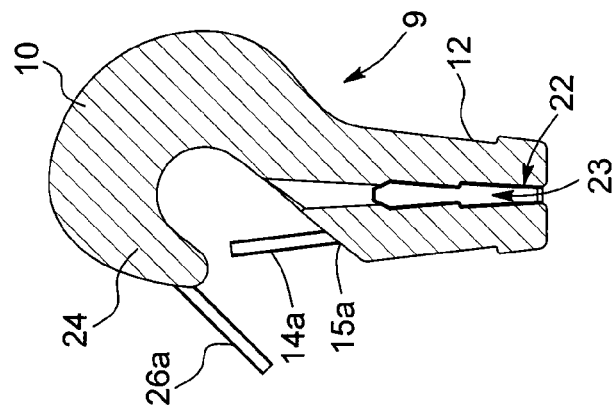
FIG. 22 is a cross-sectional view of the C-shaped hook along line XXII of FIG. 21.
Figure 21:
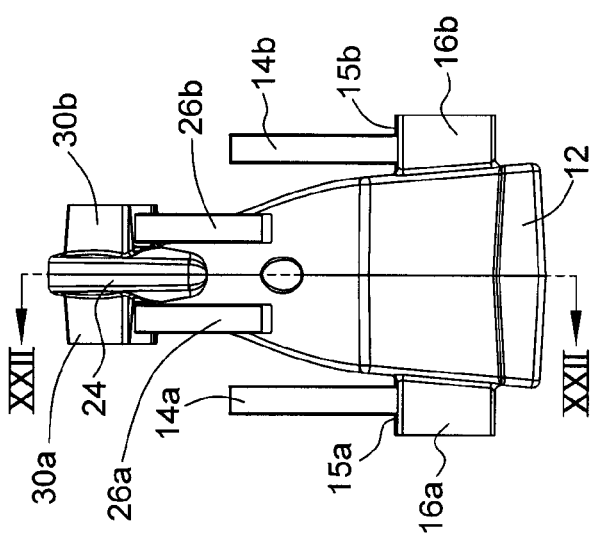
FIG. 21 is a front view of a C-shaped hook according to an optional aspect of the present invention.

Referring to FIGS. 16 and 17, according to another optional aspect of the present invention, the hook (8) may also include first and second extension members (26a, 26b) extending from the end tip (24) of the curved portion (10) in opposed parallel relation to each other and beyond the entrance of the concave receiving area (11). The end tip (24) optionally includes first and second slots (27a, 27b) provided on first and second protrusions (30a, 30b) extending away from each opposite side of the end tip (24). Similarly to the base portion protrusion (14) engaging the mounting part of the flexible member (14), the two protrusions (30a, 30b) optionally include slots (27a, 27b) with a dove tail shape. The extension members (26a, 26b) may be chemically fixed in to the slots (27a, 27b). Optionally, an angle (α) between the flexible member (14) and the extension members (30a, 30b) ranges from about 10° to about 60° and is more optionally about 45° C. This configuration of the ho ok (8) with two extension members (26a and 26b) enhances the guiding of the hook and its stability, and limits the hook twisting.

Referring to FIGS. 18 to 22, according to another optional aspect of the present invention, the hook (8) may also include first and second flexible members (14a, 14b). The two flexible members (14a, 14b) and the two extension members (26a, 26b) are optionally arranged in a jaw-like configuration so as to catch and retain the anchor element. The first and second flexible members (14a, 14b) optionally extend respectively from first and second slots (15a, 15b) provided on first and second protrusions (16a, 16b) on opposite sides of the base portion. In this configuration, the two flexible members (14a, 14b) are laterally offset with respect to a central plane of the main component (9) and may also be laterally spaced away from the respective side surfaces of the main component (9). This configuration of the hook (8) with two flexible members (14a and 14b) enhances the stability of the hooking and, as the first and second flexible members are spaced away from the main component (9), their deflection may be augmented to facilitate the hooking and reduce the stress on the extension member(s).

Figure 20:
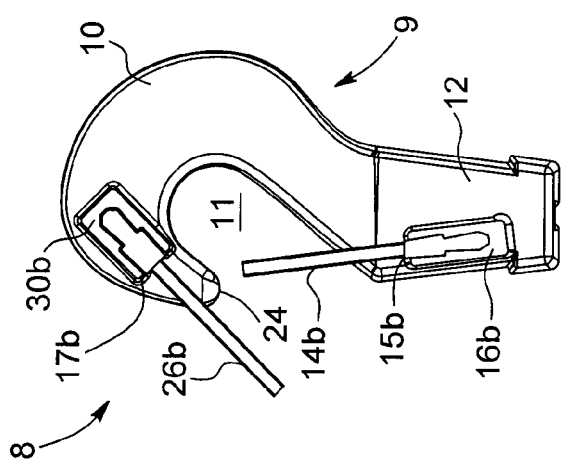
FIG. 20 is a side view of a C-shaped hook provided according to another optional aspect of the present invention.

As better seen on FIG. 20, each protrusion (16a, 16b, 30a and 30b) may include a slot (16a, 16b, 17a and 17b) having a dove tail shape which may be opened from a distal side of the protrusion. The respective flexible members (14a, 14b) and extension members (26a, 26b) are chemically fixed with non-corroding adhesive to the respective dove tail-shaped slot (16a, 16b, 17a and 17b).

According to an optional aspect of the hook, the extension member may have a guiding surface aligned with an inner surface of the curved portion so as to define a substantially continuous and/or co-planar surface for facilitating the entrance of the anchor element into the concave receiving area. The extension member may be a one-piece structure or include several components. It should be understood that all the embodiments and aspects relating to the extension members (26a, 26b) as illustrated in FIGS. 16 to 30 are also applicable to the extension member (26) as illustrated in FIGS. 14 and 15.

FIGS. 23 to 30 illustrate four possible configurations of the extension member (26a, 26b) having a guiding surface (32) aligned with an inner surface (34) of the curved portion (10). The alignment of the guiding surface (32) and the inner surface (34) of the curved portion (10) may define a substantially continuous surface for allowing improved reliability and efficiency of hooking. Indeed, this substantially continuous surface enhances the sliding of the anchor element into the concave receiving area (11), while minimizing blockages that could occur when reaching the end tip (24) of the curved portion (10).

Figure 23:
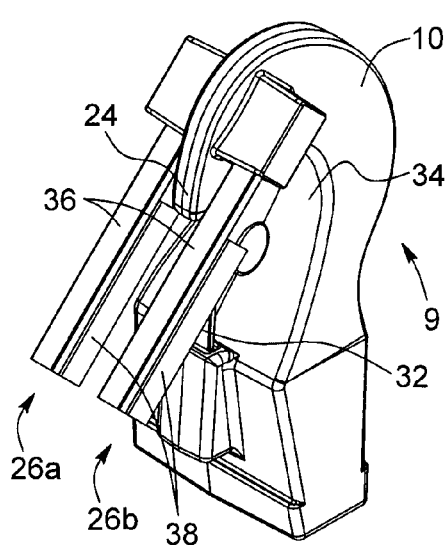
FIG. 23 is a perspective view of a C-shaped hook provided with an aligned extension member according to another optional aspect of the present invention.
Figure 24:
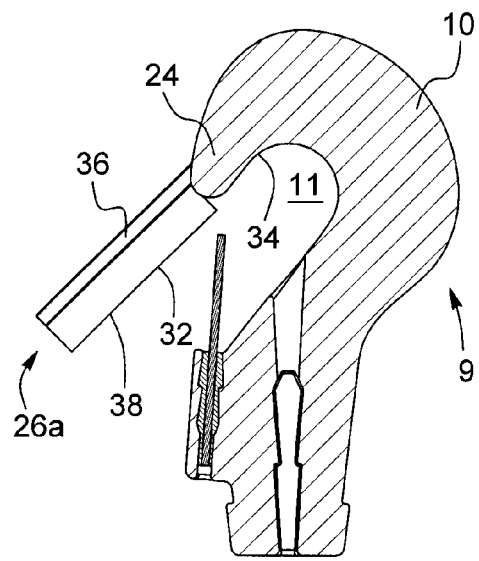
FIG. 24 is a cross-sectional view of the C-shaped hook of FIG. 23.
Figure 25:
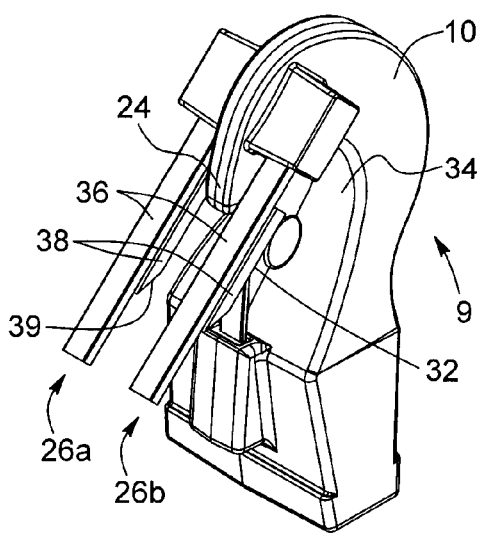
FIG. 25 is a perspective view of a C-shaped hook provided with an aligned extension member according to another optional aspect of the present invention.
Figure 26:
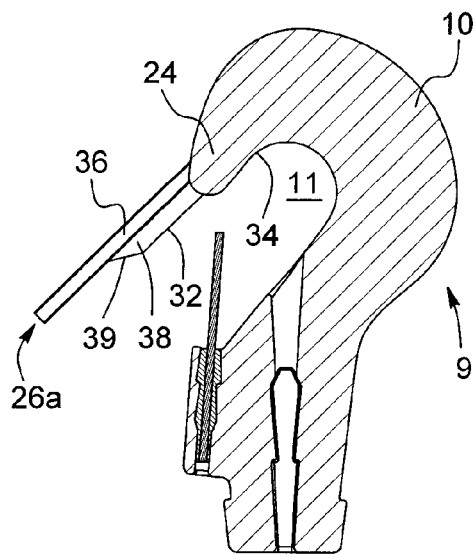
FIG. 26 is a cross-sectional view of the C-shaped hook of FIG. 25.
Figure 27:
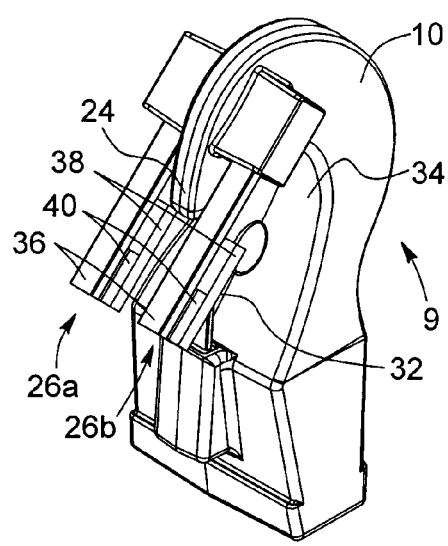
FIG. 27 is a perspective view of a C-shaped hook provided with an aligned extension member according to another optional aspect of the present invention.
Figure 28:
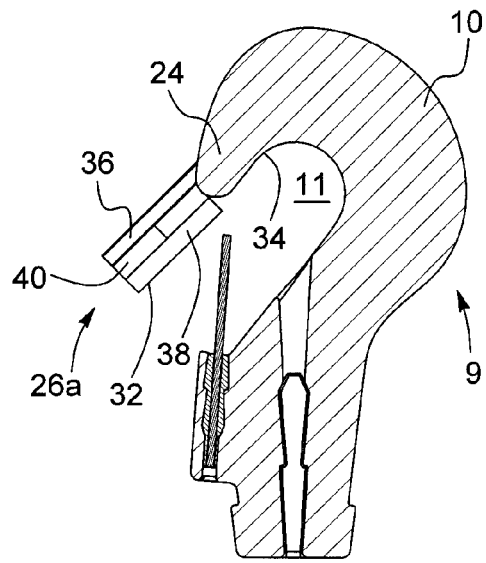
FIG. 28 is a cross-sectional view of the C-shaped hook of FIG. 27.
Figure 29:
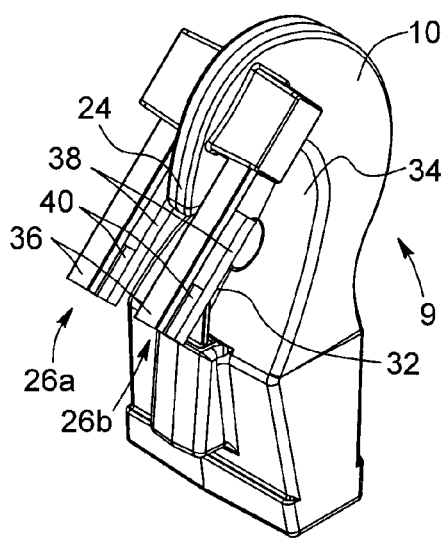
FIG. 29 is a perspective view of a C-shaped hook provided with an aligned extension member according to another optional aspect of the present invention.
Figure 30:
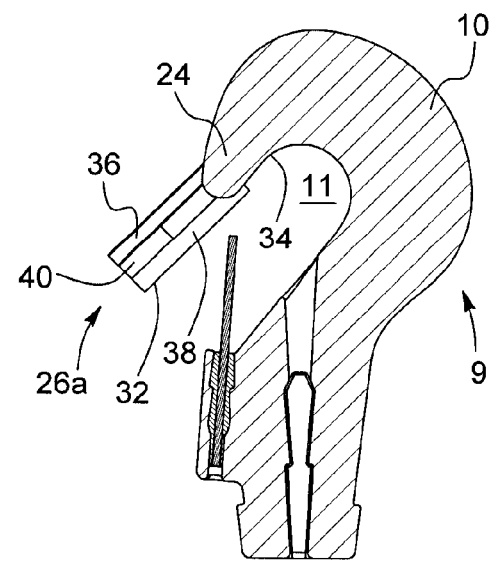
FIG. 30 is a cross-sectional view of the C-shaped hook of FIG. 29.

Referring to FIGS. 23 to 26, the extension member (26a, 26b) may include an elongated upper component (36) and a lower component (38), connected to the elongated upper component (36) and provided with the guiding surface (32). The lower component (38) may be shorter than the elongated upper component (36). The lower component (38) may be fixed to the elongated upper component (36), optionally chemically fixed to the elongated upper component (36). FIGS. 23 and 24 illustrate the lower component (38) having a rectangular shape, thereby defining a substantially rectangular-shaped extension member (26a, 26b) having a guiding surface (32) substantially continuous to the inner surface (34) of the curved portion (10). FIGS. 25 and 26 illustrate the lower component (38) having a tapered distal end (39), thereby facilitating the sliding of the anchor element along the guiding surface (32) into the concave receiving area (11).

Referring to FIGS. 27 to 30, the extension member (26a, 26b) may further include an intermediate component (40) located between the elongated upper component (36) and the lower component (38). The intermediate component (40) may extend from a distal end of the elongated upper component (36) unto a middle region of the elongated upper component (36), such that the intermediate component (40) does not reach the end tip (24) of the curved portion (10).

The lower component (38) may either extend along the upper elongated component (36) unto the end tip (24) of the curved portion (10) (as seen on FIGS. 23, 24, 27 and 28) or extend farther along each side of the curved portion (10) (as seen on FIGS. 25, 26, 29 and 30).

According to optional aspects of the present invention, the flexible member (14) may be composed of a pultruded material and may be a one-piece structure. The flexible member (16) and the extension member (26) may have a rod shape or an elongated tab shape. The possible materials of the flexible member (14) are pultruded materials including fiberglass, graphite, carbon fiber and sisal fiber joined with thermoset resin such as, polyester, epoxy, vinyl ester, phenolic and acrylic. The pultruded materials also include thermoplastic fibers such as polyester, nylon, polypropylene, polyethylene and other polyacetates. The possible materials of the extension member (26) include fiberglass, graphite, carbon fiber and sisal fiber joined with thermoset resin such as, polyester, epoxy, vinyl ester, phenolic and acrylic. The possible materials of the extension member(s) also include thermoplastic fibers such as polyester, nylon, polypropylene, polyethylene and or other polyacetates.

The thickness of the flexible member (14) may range from about 1 mm to about 8 mm. The thickness of the extension member (26) may range from about 1 mm to about 8 mm. The angle of deflection of the flexible member (14) from its resting closed position may range between about 10° and about 70°.

The main component (9) of the hook (8) may be a one-piece structure and be composed of cast iron covered with galvanized material. The extension member (26) may be molded onto the main component as a one-piece structure in cast iron covered with galvanized material.

Figure 31:
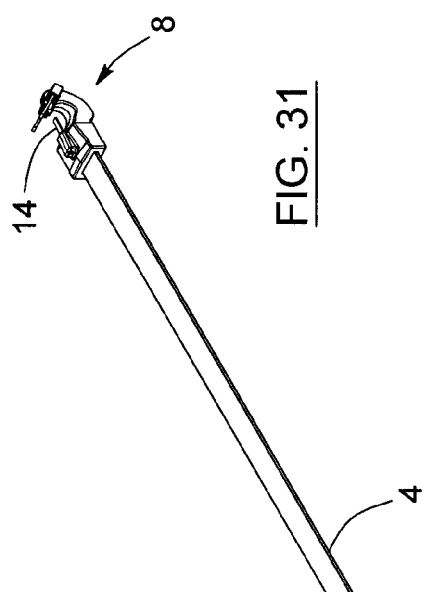
FIG. 31 is a perspective view of an underground strap provided at both end with a C-shaped hook according to another optional aspect of the present invention.
Figure 32:
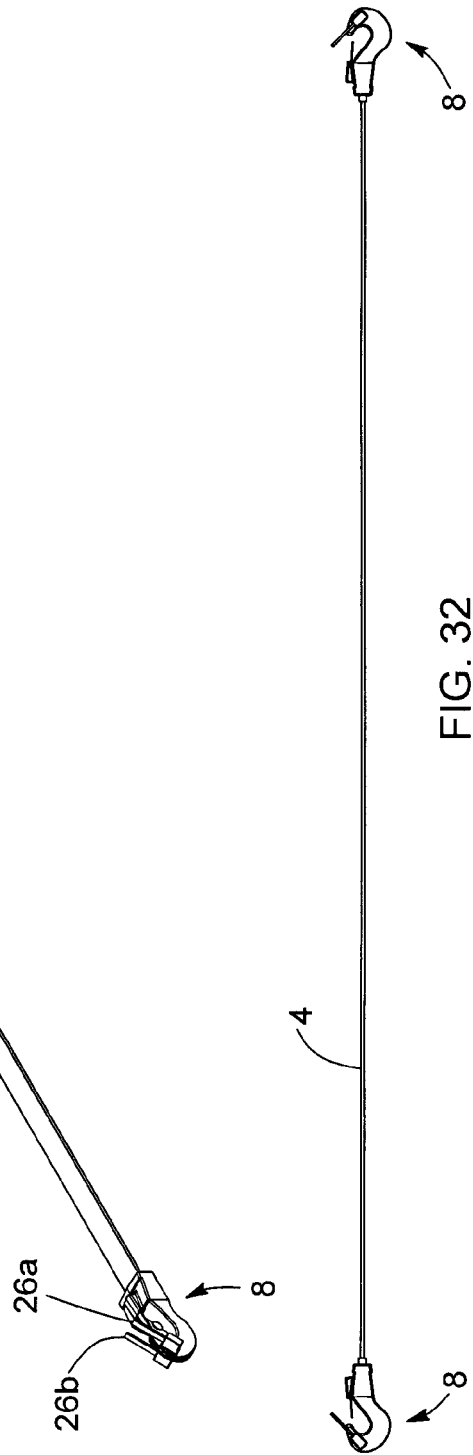
FIG. 32 is a side view of the underground strap of FIG. 31.

According to another aspect of the present invention, a hold-down strap including a strap (4) having two opposed ends and a hook (8) as previously described attached to at least one of the opposed ends. FIGS. 31 and 32 provide respective perspective and side views of a hold down strap according to the present invention having a hook (8), as illustrated on FIGS. 16 and 17, at either opposite end of the strap (4).

According to another aspect of the present invention, a method of holding down an underground tank includes four main steps which are providing a hold down strap (4) with a hook (8) as previously described; providing an underground tank (2) having an upper part; providing an anchor element (6b) proximate to the underground tank (2) and below the upper part of the tank (2); and casting the first end of the hold down strap (4) from the upper part of the tank (2) down toward the anchor element (6b), the casting including three main stages as previously described.

The present invention is not limited to including a pair of extension members or a pair of flexible members, but may also include a plurality of extension and flexible members fixed and located on the main component similarly to the previously described embodiments.

The invention claimed is:

1. A hook for attaching a hold down strap to an anchor element for holding down an underground tank, the hook comprising:
   a main component comprising:
      a base portion connectable to the hold down strap, the base portion comprising a slot, and
      a curved portion extending from the base portion and defining a concave receiving area having an entrance sized and configured for receiving the anchor element; and
   a flexible member extending across the entrance of the concave receiving area and having a mounting segment that is chemically fixed within the slot of the base portion, the flexible member being sized and configured to bend from a closed position to an open position such that when the anchor element traverses the entrance, the flexible member bends from the closed position toward the concave receiving area to the open position, thus allowing the anchor element to enter the concave receiving area, and the flexible member then returns to the closed position thus retaining the anchor element within the receiving area.

2. The hook according to claim 1, wherein the flexible member is provided with a degree of flexibility enabling sufficient bending in response to casting the hook from an upper part of the underground tank to allow entry of the anchor element into the concave receiving area, while preventing sufficient bending to allow releasing the anchor element from the concave receiving area in response to slack on the hold down strap.

3. The hook according to claim 1, wherein the mounting segment is chemically fixed within the slot using a non-corroding adhesive.

4. The hook according to claim 3, wherein the non-corroding adhesive comprises epoxy, thermoset resin, polyester, vinyl ester, acrylic, silicone, or thermal glue.

5. The hook according to claim 4, wherein the thermal glue comprises polypropylene or polyethylene.

6. The hook according to claim 1, wherein the base portion has a longitudinal axis generally aligned with the hold down strap, and wherein the flexible member extends in parallel relation to the longitudinal axis.

7. The hook according to claim 1, wherein the slot is provided within a protrusion that extends from the base portion away from the concave receiving area.

8. The hook according to claim 1, wherein the slot has a dove-tail shape.

9. The hook according to claim 1, wherein the curved portion has an end tip, wherein the flexible member is arranged in opposed and aligned relation with the end tip.

10. The hook according to claim 9, wherein the flexible member is spaced away from the end tip.

11. The hook according to claim 1, wherein the flexible member is composed of pultruded material.

12. The hook according to claim 1, wherein the flexible member is composed of thermoplastic or elastomeric thermoset material.

13. The hook according to claim 1, wherein the main component is a one-piece structure.

14. The hook according to claim 1, wherein the main component comprises galvanized metal.

15. The hook according to claim 1, wherein the flexible member is a first flexible member, and wherein the hook comprises a second flexible member extending in opposed parallel relation to the first flexible member.

16. The hook according to claim 15, wherein the base portion comprises a first slot and a second slot provided on either side thereof, the first and second flexible members each having a mounting segment that are respectively mounted within the first and second slots and chemically fixed therein.

17. The hook according to claim 1, comprising an extension member extending from the curved portion beyond the entrance of the concave receiving area.

18. The hook according to claim 17, wherein the extension member is configured in oblique relation to the flexible member.

19. A hook for attaching a hold down strap to an anchor element for holding down an underground tank, the hook comprising:
   a main component comprising:
      a base portion connectable to the hold down strap;
      a curved portion extending from the base portion and defining a concave receiving area having an entrance sized and configured for receiving the anchor element; and
   an extension member extending from the curved portion beyond the entrance of the concave receiving area and being fixed to the main component, the extension member having a guiding surface sized, configured and aligned to facilitate guidance and entrance of the anchor element into the concave receiving area;
   wherein the extension member comprises an elongated upper component and a lower component, the lower component being chemically fixed to the elongated upper component and provided with the guiding surface.

20. The hook according to claim 19, wherein the guiding surface is sized, configured and aligned with an inner surface of the curved portion of the hook so as to define a substantially continuous or co-planar surface for enhancing the sliding of the anchor element into the concave receiving area.

21. The hook according to claim 19, wherein the lower component is of rectangular shape.

22. The hook according to claim 19, wherein the lower component has a distal end which is tapered.

23. The hook according to claim 19, wherein the extension member comprises an intermediate component, the intermediate component being located between the elongated upper component and the lower component.

24. The hook according to claim 19, wherein the lower component extends along the elongated upper component unto an end tip of the curved portion.

25. The hook according to claim 19, wherein the lower component extends along the elongated upper component and farther along the curved portion.

26. A hold down strap for holding down an underground tank, the hold down strap comprising:
   a strap having two opposed ends; and
   a hook attached to at least one of the two opposed ends, the hook comprising:
      a main component comprising:
         a base portion connectable to the hold down strap, the base portion comprising a slot; and
         a curved portion extending from the base portion and defining a concave receiving area having an entrance sized and configured for receiving the anchor element; and
      a flexible member extending across the entrance of the concave receiving area and having a mounting segment that is mounted and chemically fixed within the slot of the base portion, the flexible member being sized and configured to bend from a closed position to an open position such that when the anchor element traverses the entrance, the flexible member bends from the closed position toward the concave receiving area to the open position, thus allowing the anchor element to enter the concave receiving area, and the flexible member then returns to the closed position thus retaining the anchor element within the receiving area.

* * * * *